(12) United States Patent
Khafagy et al.

(10) Patent No.: US 11,027,592 B2
(45) Date of Patent: Jun. 8, 2021

(54) VEHICLE THERMAL MANAGEMENT SYSTEMS AND METHODS

(71) Applicant: FORD GLOBAL TECHNOLOGIES, LLC, Dearborn, MI (US)

(72) Inventors: Hafiz Shafeek Khafagy, Dearborn, MI (US); Kirk Pebley, Novi, MI (US); Eric Michael Rademacher, Royal Oak, MI (US); Michael J. Irby, Monroe, MI (US); James C. Rollinson, Superior Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 265 days.

(21) Appl. No.: 15/985,406

(22) Filed: May 21, 2018

(65) Prior Publication Data

US 2019/0329626 A1 Oct. 31, 2019

Related U.S. Application Data

(63) Continuation of application No. 14/923,930, filed on Oct. 27, 2015, now Pat. No. 9,975,399.

(51) Int. Cl.
*B60H 1/00* (2006.01)
*B60H 1/22* (2006.01)
*B60H 1/18* (2006.01)

(52) U.S. Cl.
CPC ..... *B60H 1/00764* (2013.01); *B60H 1/00007* (2013.01); *B60H 1/00042* (2013.01); *B60H 1/18* (2013.01); *B60H 1/2218* (2013.01); *B60H 2001/2253* (2013.01); *B60H 2001/2262* (2013.01)

(58) Field of Classification Search
CPC ............ B60H 1/00007; B60H 1/00042; B60H 1/00764; B60H 1/18; B60H 1/2218; B60H 2001/2253; B60H 2001/2262
See application file for complete search history.

(56) References Cited

U.S. PATENT DOCUMENTS

| | | | |
|---|---|---|---|
| 7,028,767 B2 | 4/2006 | Takano et al. | |
| 2009/0314023 A1 | 12/2009 | Labaste Mauhe et al. | |
| 2011/0233189 A1* | 9/2011 | Reiss | B60H 1/2218 219/492 |
| 2014/0342260 A1 | 11/2014 | Koyama et al. | |
| 2015/0283878 A1* | 10/2015 | Rose | B60H 1/004 701/36 |
| 2015/0298523 A1* | 10/2015 | Patel | B60H 1/00964 237/2 A |

FOREIGN PATENT DOCUMENTS

FR 2882864 A1 9/2006

* cited by examiner

*Primary Examiner* — Robert J Utama
*Assistant Examiner* — Joe E Mills, Jr.
(74) *Attorney, Agent, or Firm* — David B. Kelley; Brooks Kushman P.C.

(57) ABSTRACT

A vehicle climate control system includes a heat exchanger to heat ambient air using engine waste heat, and a plurality of positive temperature coefficient (PTC) heating elements to heat air passed through the heat exchanger. The vehicle also includes a controller programmed to, while the vehicle is driven without engine propulsion, issue a command to sequentially de-energize the PTC heating elements before an upcoming engine activation. The sequential de-energization of the PTC heating elements is performed according to a schedule that is based upon a power surge dissipation time.

20 Claims, 6 Drawing Sheets

VEHICLE THERMAL MANAGEMENT SYSTEMS AND METHODS

CROSS-REFERENCE TO RELATED APPLICATIONS

This application is a continuation of U.S. application Ser. No. 14/923,930 filed Oct. 27, 2015 issuing as U.S. Pat. No. 9,975,399 on May 22, 2018, the disclosures of which are hereby incorporated in their entirety by reference herein.

TECHNICAL FIELD

The present disclosure relates to operation of a vehicle climate control system.

BACKGROUND

Vehicle thermal management systems may include climate control systems that use waste heat generated by a combustion engine to aid in warming the passenger cabin. The climate control system redirects the heat to keep windows clear and ensure thermal comfort for passengers. Different engines may require various durations of time to warm up and develop the necessary heat generation to aid in passenger cabin heating.

SUMMARY

According to aspects of the present disclosure, a vehicle climate control system includes a heat exchanger to heat ambient air using engine waste heat, and a plurality of positive temperature coefficient (PTC) heating elements to heat air passed through the heat exchanger. The vehicle also includes a controller programmed to, while the vehicle is driven without engine propulsion, issue a command to sequentially de-energize the PTC heating elements before an upcoming engine activation. The sequential de-energization of the PTC heating elements is performed according to a schedule that is based upon a power surge dissipation time.

According to other aspects of the present disclosure, a method of controlling a vehicle climate control system includes sequentially energizing a plurality of positive temperature coefficient (PTC) heating elements in response to vehicle operation while an ambient temperature is less than a threshold. The method also includes sequentially de-energizing the PTC heating elements prior to activating an engine for propulsion. The method further includes sequentially re-energizing the PTC heating elements following activation of the engine. Each subsequent energization and subsequent de-energization is performed according to a schedule that is based upon a power surge dissipation time.

According to further aspects of the present disclosure, a vehicle includes a climate control system having a plurality of positive temperature coefficient (PTC) heating elements. The vehicle also includes a controller programmed to issue a command to sequentially energize each of the plurality of heating elements in response to an engine operating temperature that is less than an engine temperature threshold. Energization of the PTC heating elements is performed according to schedule that is based upon a power load surge dissipation time associated with an individual PTC heating element.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
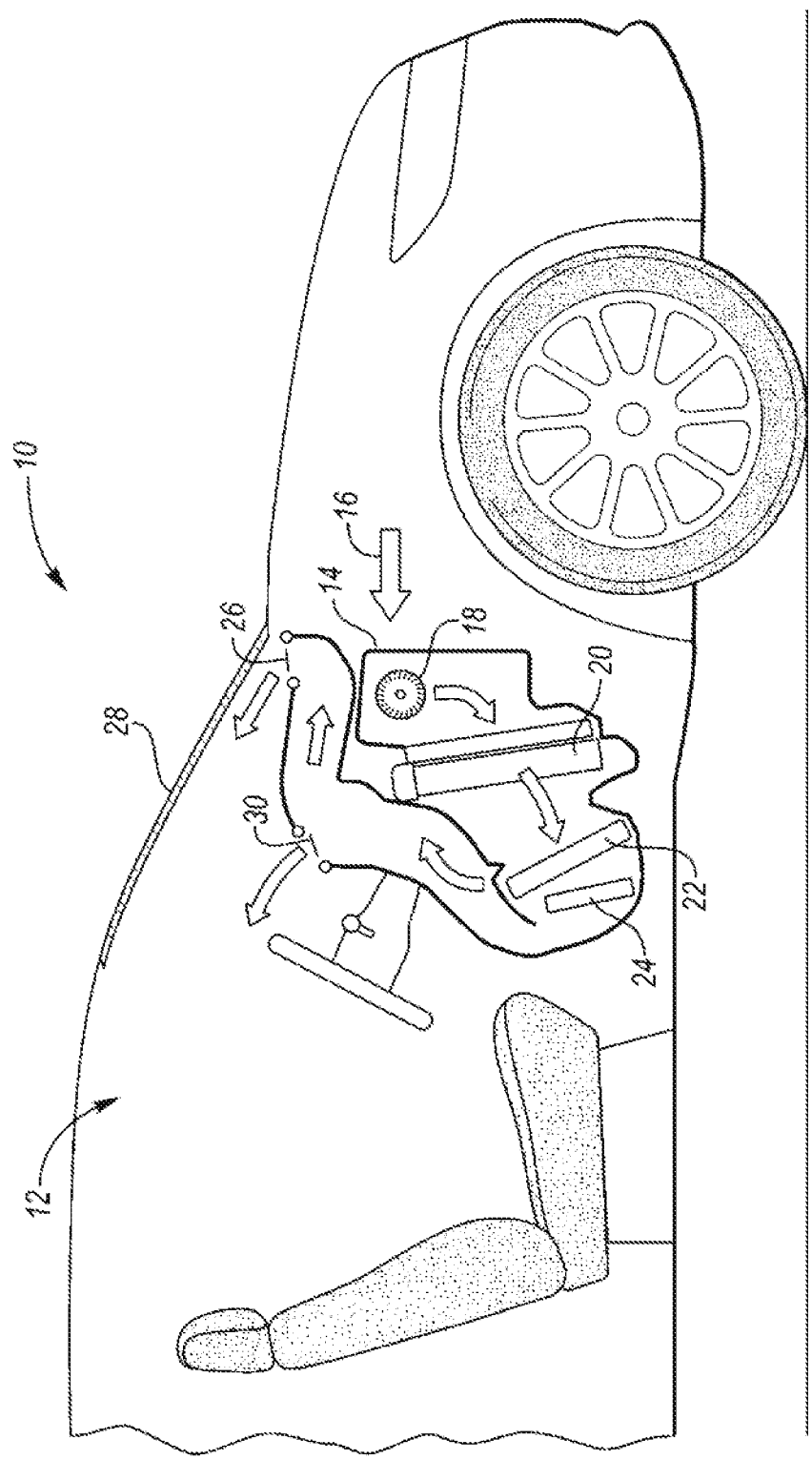
FIG. 1 is a fragmentary side view schematic of a vehicle having a thermal management system.

Referring to FIG. 1, a vehicle 10 includes a passenger cabin 12 for transporting occupants. The vehicle 10 includes a climate control system 14 to thermally manage the internal environment of the vehicle passenger cabin 12. The climate control system 14 takes in ambient air indicated by arrow 16 and influences the temperature of the air before passing the air into the passenger cabin. The climate control system 14 may include one or more blowers 18 to force air through the climate control system 14 to the passenger cabin. The climate control system 14 also may include an evaporator 20 and a heat exchanger 22. The heat exchanger 22 may be in fluid flow connection with the vehicle internal combustion engine (not shown) to receive waste heat to heat ambient air passing into the climate control system 14.

There may be several operational states where the internal combustion engine is unable to generate sufficient heat to warm the passenger cabin to a comfortable temperature and clear the vehicle windows for visibility. For example, following a cold start the engine may require several minutes to generate sufficient waste heat to warm up air passed through the heat exchanger. Additionally, during low temperature ambient conditions the engine may take additional time to warm up. Further, a hybrid powertrain having both an internal combustion and an electric machine as propulsion sources may operate for extended periods with the engine turned off. The climate control system 14 includes an auxiliary heating source to quickly warm air supplied to the passenger cabin independent of any waste heat provided by the engine. An electric auxiliary heater 24 may be provided within the climate control system 14 downstream of the heat exchanger 22 to further heat air prior to entering the vehicle passenger cabin 12. Warmed air is then exhausted from the climate control system through one or more vents. A first vent 26 is located adjacent to the vehicle windshield 28 to defrost and/or defog the glass and enhance driver visibility. A second vent 30 may be located and oriented to direct warmed air into the main portion of the passenger cabin to enhance passenger comfort.

In at least one embodiment, the auxiliary heater 24 includes a plurality of positive temperature coefficient (PTC) heating elements. The heating elements may be grouped into banks and arranged to focus warmed air to desired locations in one example, two PTC heater banks are dedicated to warming the windshield, and four PTC heater banks are dedicated to warming the main portion of the passenger cabin.

The PTC heating elements may be constructed from a ceramic material having a low value of electrical resistance at low temperatures. When a voltage is applied to the cold PTC elements, a high current is generated and the value of resistance rises with the temperature. As current flows through the PTC elements, heat is produced by electrical dissipation until a steady state is reached and the resistive PTC elements have reached their working temperature. As the steady state working temperature is approached, the resistance increases dramatically, allowing much less current to flow. The resistance change near the working temperature can be significant within a temperature span of only a few degrees. If the voltage remains constant, the current will stabilize at a certain value as the PTC element reaches thermal equilibrium. The value of the equilibrium temperature depends on the voltage applied, the material selected, as well as the degree of thermal dissipation. For increased heat transfer, the ceramic heating elements may be mounted on aluminum heat sinks or grids.

The steady state temperature operation of PTC heating elements offers several advantages. The maximum surface temperature eliminates the need for separate components for over-temperature protection. The steady state working temperature is far below the ignition temperatures of adjacent components within the thermal management system. Therefore damage to the PTC element itself and surrounding components related to elevated temperatures is avoided due to the internal temperature being limited.

PTC heating elements as used in the present disclosure provide a solution for plug-in hybrid vehicles, mode-switching hybrid electric vehicles, and all-electric vehicles. In each case, the electrified powertrain may not generate sufficient heat on its own to warm up the passenger cabin. A powertrain-independent heating system provides an adequate supply of heat for passenger comfort as well as window clearing for visibility.

The hybrid vehicle of the present disclosure also includes a high voltage traction battery to power an electric machine used for propulsion. The PTC heaters may be powered directly by the high voltage traction battery. The voltage may be regulated, or stepped down to an appropriate level to power the PTC heating elements. Alternatively, the PTC heating elements may be powered using standard vehicle voltage, for example powered using the 12 Volt standard battery bus. Further still, the power source could be split such that certain PTC heater banks are powered by the high voltage battery, and others powered by the 12 Volt standard battery. In at least one embodiment, the PTC heater banks dedicated to thermally regulating the windshield require 400 Watts each, and the PTC heaters dedicated to thermally regulating the passenger cabin environment are 250 Watts each.

Figure 2:
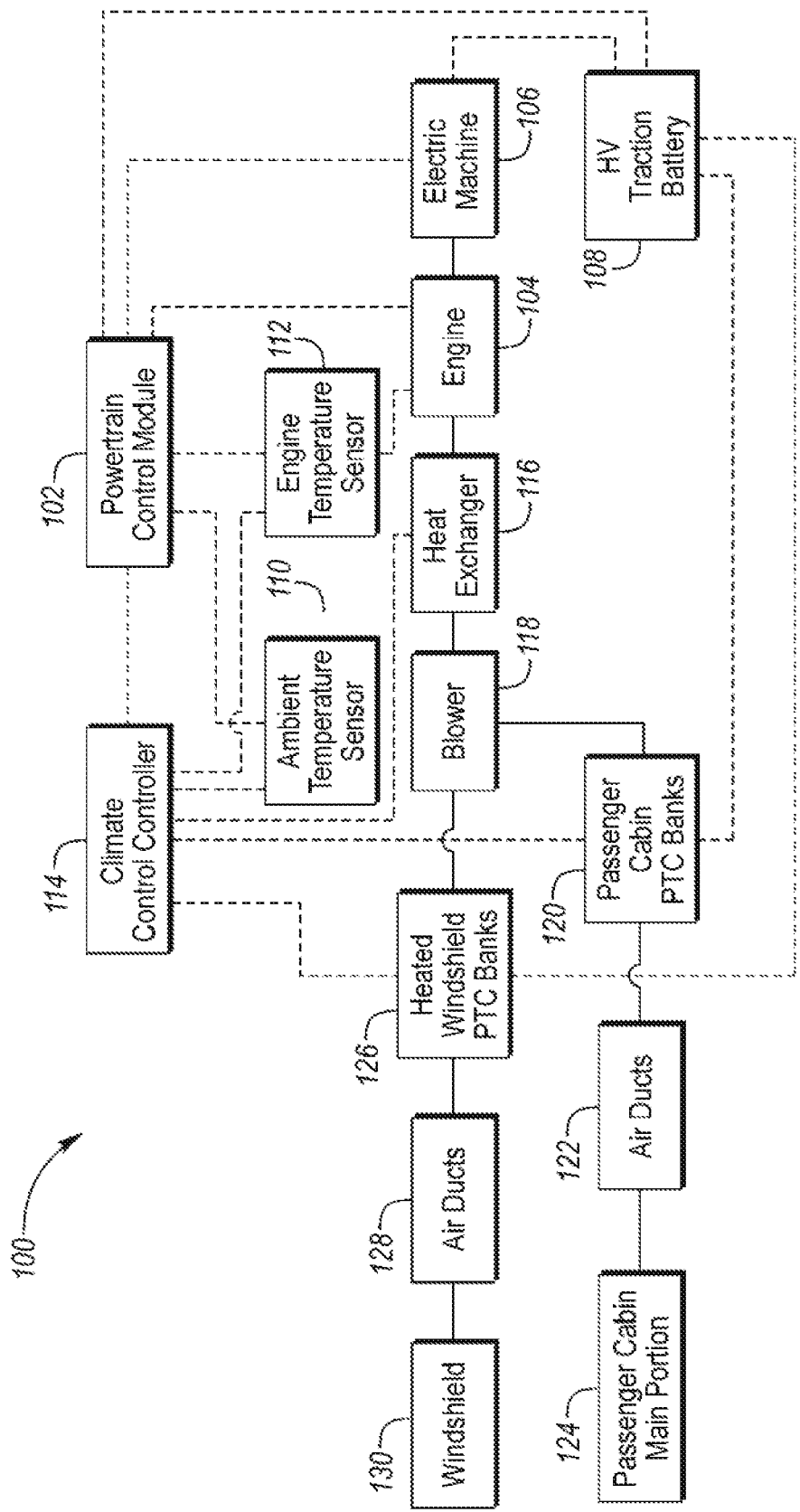
FIG. 2 is a system schematic of a vehicle powertrain and thermal management system.

Referring to FIG. 2, a schematic of vehicle 100 is depicted. A powertrain controller module (PCM) 102 is shown as one controller, but may include several different system controllers which govern the operation of the powertrain. The PCM 102 is in electrical connection with powertrain systems, such as an internal combustion engine (ICE) 104, an electric machine 106, and a high voltage traction battery 108. The high voltage traction battery 108 provides power to the electric machine 106 for vehicle propulsion. The PCM 102 may also receive signals from a number of sensors, including an ambient temperature sensor 110 and an engine temperature sensor 112. Based on various operating conditions, including at least torque demand, traction battery state of charge, vehicle speed, and fuel efficiency, the PCM 102 may control selection of operation modes of the hybrid powertrain. More specifically, the PCM 102 may issue commands to selectively propel the vehicle 100 in any one of several different modes including: (i) operating only the ICE 104; (ii) operating both of the ICE 104 and the electric machine 106 in "Hybrid" mode; or (iii) operating only the electric machine 106 in electric vehicle "EV" mode.

The vehicle 100 also includes a climate control system controller 114 to control operation of the climate control system. The climate control system controller 114 is in electrical connection with a heat exchanger 116 which receives waste heat from the operation of the ICE 104. A blower 118 is provided to force air across the heat exchanger and through a duct system into the passenger cabin. The heat exchanger 116 may also include a temperature sensor to monitor air temperature exiting the heat exchanger.

Auxiliary heating is provided by the climate control system through the operation of one or more PTC heating elements. In the example of FIG. 2, a plurality of PTC heating elements is included within each of a number of passenger cabin PTC banks 120 which are in fluid flow communication with air ducts 122. The air ducts 122 are arranged to direct heated air to a main portion 124 of the passenger cabin. Similarly, a plurality of PTC heating elements is combined within each of a number of heated windshield PTC banks 126 which are in fluid flow communication with air ducts 128 that direct heated air to defrost and defog a windshield 130 of the vehicle for enhanced visibility. Each of the individual PTC banks may be powered though its own dedicated relay to allow for independently activating and deactivating the separate banks.

The climate control system controller 114 also receives signals indicative of temperature from each of the ambient temperature sensor 110 and the engine temperature sensor 112. As discussed in more detail below the controller 114 may cause operation of either the primary heating portion using heat supplied by the engine, the auxiliary heating PTC banks 120, 126, or a combination of the primary heating elements and the auxiliary heating elements based on values indicated by each of the temperature signals. Also discussed in more detail below, the climate control system controller 114 issues commands to cause activation and deactivation of the PTC heating elements based on the operational state of the powertrain. For example, the PTC heating elements draw high current that may impact the ability for the engine to auto-start and for auto-stop. The systems and methods of the present disclosure manage the high current operation of the PTC heating elements while avoiding conflicts with power required by the hybrid powertrain during propulsion mode switching.

Figure 3A:
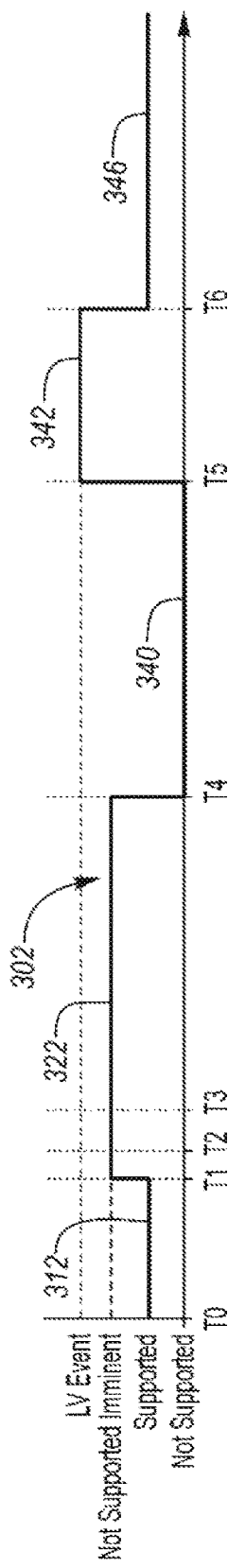
FIGS. 3A through 3E correspond in time and depict operational parameters of a vehicle thermal management system.
Figure 3B:
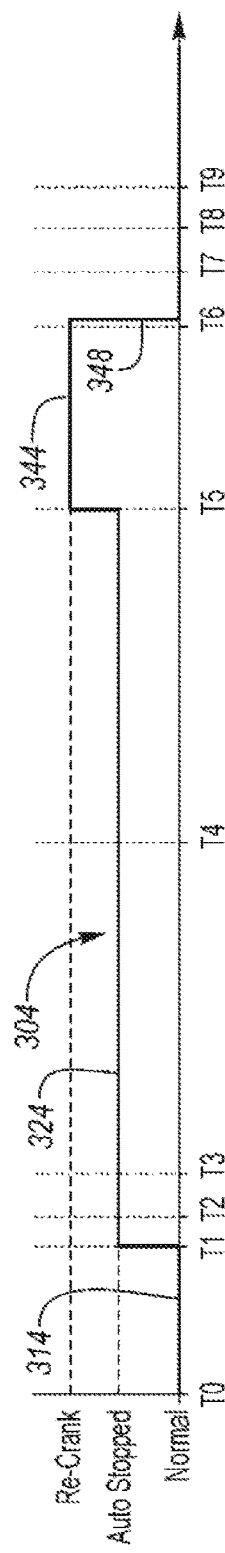
Figure 3C:
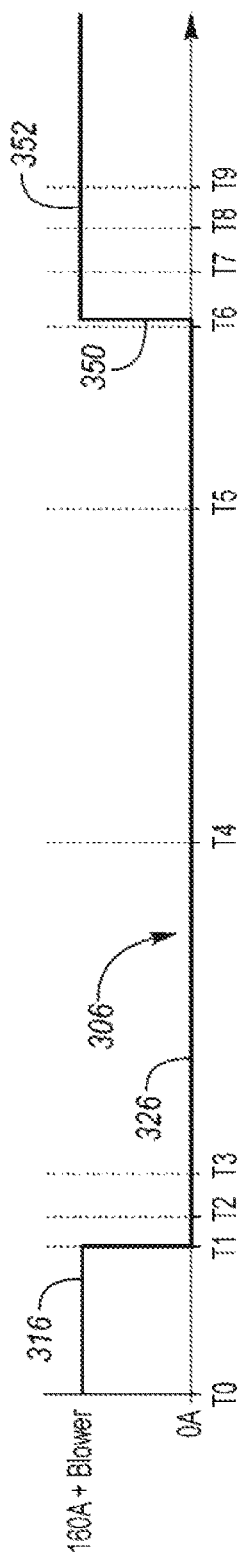
Figure 3D:
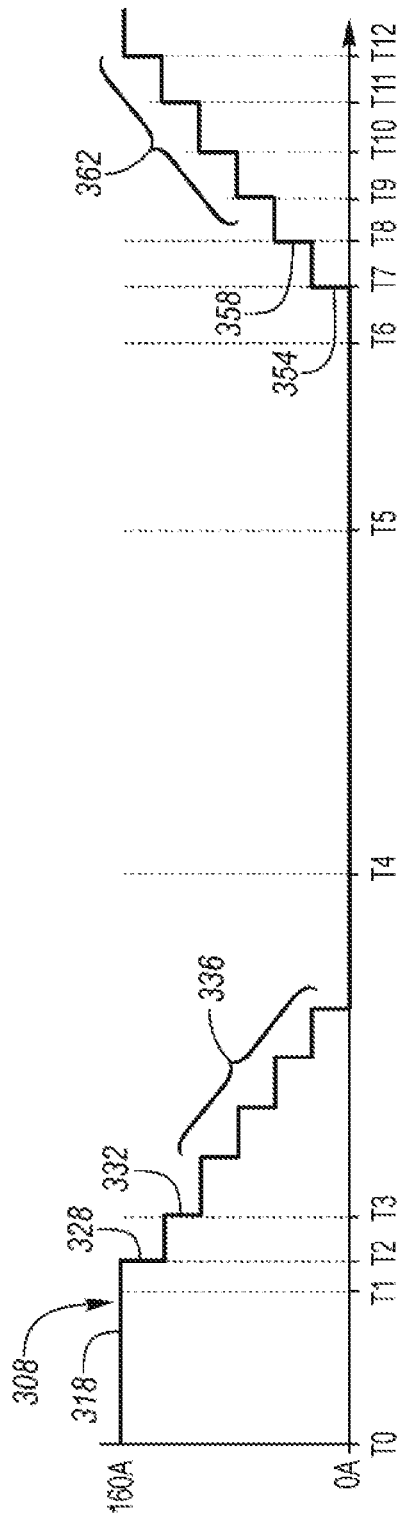
Figure 3E:
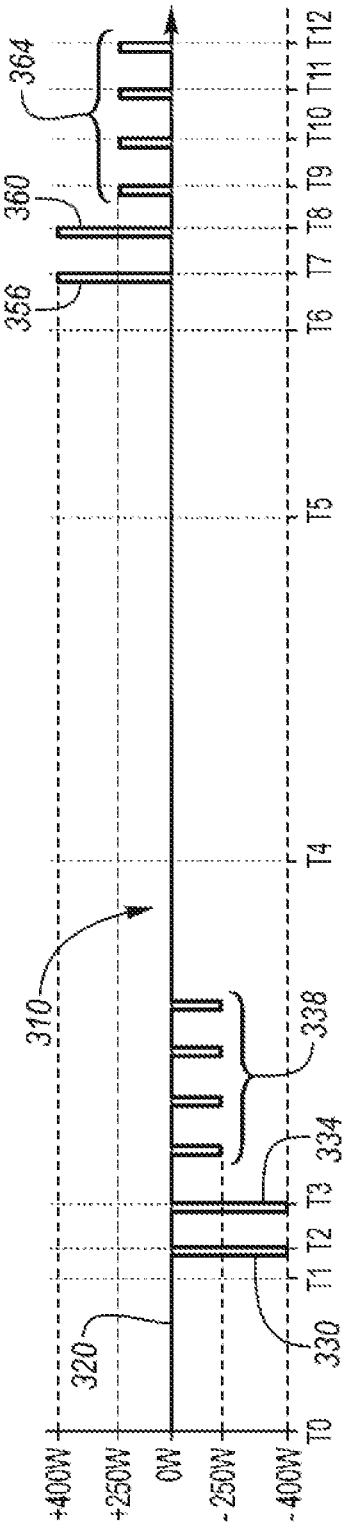

FIGS. 3A through 3E correspond to each other with respect to time as measured along the horizontal axis. The figures show various operating parameters of the climate control system. FIG. 3A depicts curve 302 which represents states of support electrical power to the PTC heating elements as communicated across the vehicle CAN bus. FIG. 3B depicts curve 304 which represents a state of operation of the PTC heating elements as it relates to the powertrain state of operation. FIG. 3C depicts curve 306 which represents a commanded current limit as applied to the climate control system. FIG. 3D depicts curve 308 which represents actual current supplied to the PTC heating elements of the climate control system. FIG. 3E depicts curve 310 which represents power surges within the vehicle electrical system related to activation and deactivation of the PTC heating elements. Each of the operating parameters is discussed below with respect to their concurrent states.

Between time T0 and time T1, region 312 of FIG. 3A represents a state of vehicle power support where power supply to the PTC heating elements is supported. Correspondingly, region 314 of FIG. 3B indicates a "normal" state of operation of the PTC heating elements. Region 316 of curve 306 indicates a command signal provided to the climate control system controller to allow sufficient current to supply all of the PTC heater banks, as well as the blower to pass air to the passenger cabin. In the example provided, the PTC heater banks collectively draw 160A of current. Region 318 of curve 308 indicates that 160A is actually supplied to the PTC heater banks such that all banks are activated and providing heat. Region 320 of curve 310 indicates that at steady state operation, the PTC heaters cause no power surges in the vehicle electrical system.

At time T1, the powertrain controller forecasts an upcoming engine auto-stop and broadcasts a control message such that the climate control system can prepare to adjust its electrical load to facilitate a smooth transition between powertrain states. At region 322 of curve 302, a CAN message is broadcast that PTC heating power draw will not be supported at an upcoming powertrain mode change. In turn, the climate control controller changes state of operation of the PTC heaters to correspond to an "auto stopped" state. Likewise, at region 326 of curve 306 the climate control controller issues a command to decrease the limit of current draw of the PTC heater banks and blower down to zero to begin to reduce electrical demands of the climate control system. Following the command to change the current draw limit, the climate control controller sequentially de-energizes the plurality of PTC heating elements. At time T2 corresponding to region 328 of curve 308 the current draw of one PTC heating bank is halted. In the example shown, the first PTC bank de-energized may correspond to a dedicated heated windshield PTC bank. It can be seen at region 330 of curve 310 that a temporary power surge occurs in the electrical system related to excess power circulating which was previously drawn by the de-energized individual PTC bank. In the example provided, the heated windshield PTC banks each draw 400 Watts of power.

Once the excess power of de-energized heating bank is dissipated, the power surge is no longer present in the vehicle electrical system. At time T3 corresponding to region 332 of curve 308, the climate control controller de-energizes a second PTC bank further reducing the current draw of the climate control system. The de-energization of the second PTC bank is performed at a timing based on the time required for the power surge to dissipate. The climate control controller imparts a delay between the de-energization of each PTC bank. In at least one embodiment, subsequent commands are spaced apart by a time duration of about 50-100 milliseconds to allow for any power surge to dissipate. A second corresponding power surge occurs at region 334 of curve 310. In the example depicted, a second heated windshield PTC bank causes a 400 Watts temporary surge.

The climate control controller sequentially de-energizes the remaining PTC heater banks allowing time for power surges to dissipate between each command prior to shut down a subsequent bank. As can be seen in region 336 of FIG. 3D, the example system includes four remaining PTC banks. Also shown in FIG. 3D, the current draw of all PTC banks is reduced to zero following region 336. The remaining four PTC banks correspond to passenger cabin warming and each draws 250 W. As can be seen in region 338 of curve 310 a 400 Watts surge is created in response to de-energization of each of the subsequent individual PTC banks. It should also be appreciated that a different duration of time delays may be employed depending on the magnitude of particular power surges caused by the de-energization individual PTC banks, as well as the particular electrical system at issue. In the context of the example provided, a delay associated with dissipation of a 250 Watt surge may be shorter than a delay associated with a 400 Watt surge. Additionally, six total PTC banks are discussed for illustration, but the systems and methods of the present disclosure may operate with any number of banks. According to an aspect of the present disclosure, the controller sequentially de-energizes the PTC heating elements according to a predetermined schedule that is based upon a power surge dissipation time.

At time T4 corresponding to region 340 of curve 302, a CAN message is broadcast that PTC heating power draw is not supported as the powertrain undergoes a mode change. In the example provided the ICE is de-activated as part of a powertrain auto-stop procedure. If the PTC heaters were allowed to de-energize during this process, the power surges may cause undesirable harshness such as a spike in engine output just prior to shut down. The spike in output may be perceived by a customer as a speed flair and detract from drivability and customer satisfaction. As can be seen in FIGS. 3B and 3C, the PTC heaters are commanded to remain in a de-energized mode throughout the powertrain mode switch. As can be seen in FIG. 3D the PTC heating banks draw substantially zero current during the powertrain mode switch.

At time T5 a CAN message is broadcast at region 342 that a low voltage event is to imminently occur. In the example provided, the low-voltage event corresponds to an engine start or "re-crank." Prior to the re-crank, the electric machine may be the sole propulsion source. The climate control system enters a re-crank state of operation such that the PTC heating elements remain de-energized while the engine is restarted. If the PTC heating banks are energized and operating while the engine is off and the electric machine is a sole propulsion source, an upcoming re-crank broadcast triggers a sequential de-activation of the PTC heating banks in advance of the upcoming engine start as described above.

Once the engine re-crank process is completed, at time T0 a CAN message is broadcast at region 346 indicating a state of vehicle power support where power supply to the PTC heating elements is supported. At time T6 corresponding to region 348 of FIG. 3B, the climate control system returns to a "normal" state of operation of the PTC heating banks. Also at time T6, corresponding to region 350 of curve 306, the climate control controller issues a command to increase the limit of current drawn by the PTC heater banks and blower to a sufficient limit to satisfy the electrical demands of the climate control system. Region 352 of curve 306 indicates a command signal provided to the climate control system controller to allow sufficient current to supply all of the PTC heater banks, as well as the blower to pass air to the passenger cabin. As discussed above, the example system of the present disclosure allocates about 160 Amps to the PTC heating banks.

Much like de-energization process described above, the PTC heating banks are sequentially re-energized to minimize any effects caused by surges in power demand. Following the command to increase the current draw limit shown at region 350, the climate control controller sequentially energizes each of the plurality of PTC heating elements. At time T7 corresponding to region 354 of FIG. 3D a first PTC bank is energized and begins to draw current. At this time a power load surge occurs as depicted at region 356 of curve 310. In the example provided a PTC heater bank corresponding to the heated windshield is activated and causes a 400 Watts spike in the power demand.

Once the surge in power demand is dissipated, the climate control controller energizes a second PTC heater bank. At time T8 corresponding to region 358 of FIG. 3D a second PTC bank is energized and begins to draw current. At this time a power load surge occurs as depicted at region 360 of curve 310 in the example provided the second PTC heater bank activated also corresponds to the heated windshield and causes a 400 Watts spike in the power demand. Similar to the discussion above, the controller may store in a memory a predetermined schedule for sequentially energizing the various PTC heater banks. The timing of the schedule is based upon a power load surge dissipation time associated with each individual PTC heating element.

Once the surge in power demand caused by energization of the second bank dissipates, the climate control controller progresses through a similar sequence to energize each of the remaining PTC heater banks. In the example provided in FIG. 3D four remaining banks are sequentially energized at region 362. The four remaining PTC banks correspond to heating of the main portion of the passenger cabin at times T9 through T12. As can be seen in FIG. 3E, a power surge occurs corresponding to the timing of energization of each of the subsequent PTC banks. A time delay between each command for energization may be set to a predetermined duration of time based upon the time required for each respective power surge caused by the individual PTC heater banks to dissipate. The delay implemented during energization may not have the same duration used during de-energization. According to an aspect of the present disclosure, the PTC heater banks dedicated to passenger cabin heating each draw about 400 Watts and cause a surge in power load of about the same magnitude when each is energized.

The systems and methods of the present disclosure avoid the need for additional components to compensate for the power surges within the electrical system caused by activation and de-activation of the PTC heaters. Sequentially energizing and de-energizing the PTC heater banks allows the system to manage the overall magnitude of the surges to an amount which can be handled by the electrical system without perceivable effects on powertrain operation.

Figure 4:
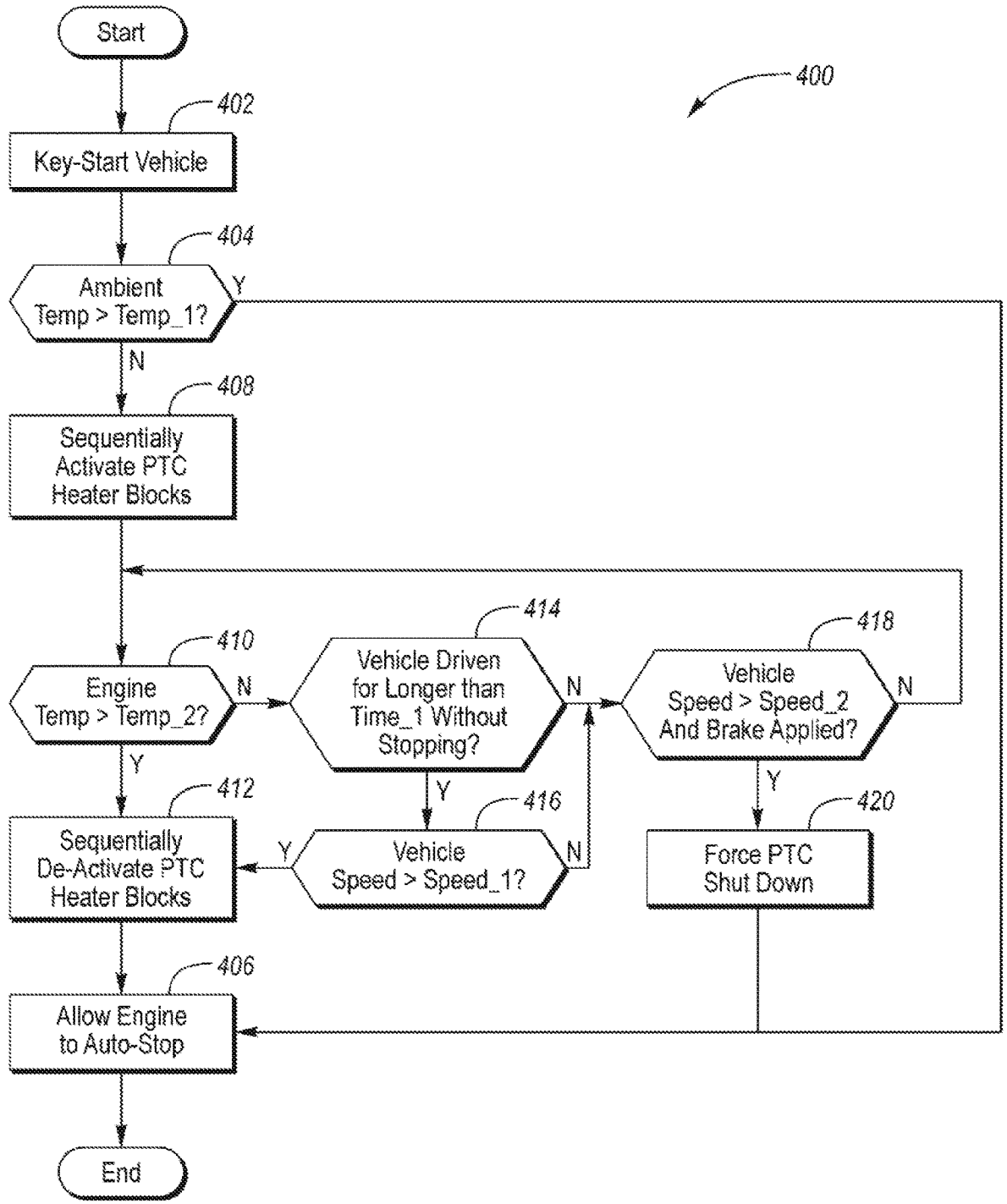
FIG. 4 is a flowchart of a control method of a thermal management system according to an embodiment.

Referring to FIG. 4, a method 400 of managing PTC heater operation relative to state of the powertrain is depicted according to an aspect of the present disclosure. At step 402 the vehicle is started. At step 404 if the ambient temperature is greater than a temperature threshold Temp_1, there may not be a need for auxiliary heating from the PTC heaters for either windshield defrost or passenger cabin heating. A vehicle controller then issues a command at step 406 to allow the engine to auto-stop according to other powertrain operating parameters without regard to power demands of PTC heaters.

At step 404 if the ambient temperature is sufficiently cold (i.e., less than threshold Temp_1) there is a need for auxiliary heating to quickly condition the passenger cabin environment. At step 408 the controller issues a command to sequentially energize each of the PTC heater banks. In this way, the power demanded from the collection of PTC heater banks does not adversely affect powertrain drivability.

At step 410 the controller assesses the temperature of the engine relative to its ability to produce sufficient waste beat to be utilized to warm the passenger cabin. If at step 410 the engine temperature is greater than temperature threshold Temp_2 there may no longer be a need for auxiliary beating from the PTC heater banks. At step 412 the controller then issues a command to sequentially de-energize each of the PTC heater banks. Once all PTC heater banks are deactivated the controller then issues a command at step 406 to allow the engine to auto-stop according to other powertrain operating parameters without regard to power demands of PTC heaters.

If at step 410 the engine temperature is insufficient to produce adequate waste heat to warm the passenger cabin (i.e., engine temperature less than predetermined engine temperature threshold Temp_2) the controller may assess other powertrain factors that suggest whether the engine will imminently be warm enough to produce sufficient waste heat to warm the passenger cabin. At step 414 the controller assesses whether the vehicle has been driven for a time duration greater than Time_1 without stopping, if so the controller assesses at step 416 whether the speed during this time duration exceeded speed threshold Speed_1. The combination of sufficient time of continuous operation and sufficient vehicle speed indicates that the engine is imminently able to produce sufficient heat to warm the passenger cabin. The controller then issues a command at step 412 to begin to sequentially de-energize the plurality of PTC heater blocks.

If at step 414 the vehicle has not been driven continuously for sufficient time, of if at step 416 the speed during this time was not sufficiently high, the controller assesses whether other abnormal conditions warrant shutting down the PTC heater banks. At step 418 the controller determines whether the vehicle is undergoing an abrupt deceleration. If the vehicle speed is greater than a speed threshold Speed_2 and the brake is applied, it may indicate an imminent engine auto stop. The powertrain operation related to the auto-stop, for example such as regenerative braking from the electric machine, may take priority over auxiliary PTC heating. In this case the controller forces a shutdown of all the PTC heater banks at step 420. Specifically, the controller may issue a command to simultaneously de-energize each individual PTC bank. Since the vehicle is rapidly decelerating, the power surge related to simultaneous de-energization of the PTC heater banks may be imperceptible to a driver. Once the PTC heater banks are deactivated the controller then issues a command at step 406 to allow the engine to auto-stop according, to other powertrain operating parameters without regard to power demands of PTC heaters.

Figure 5:
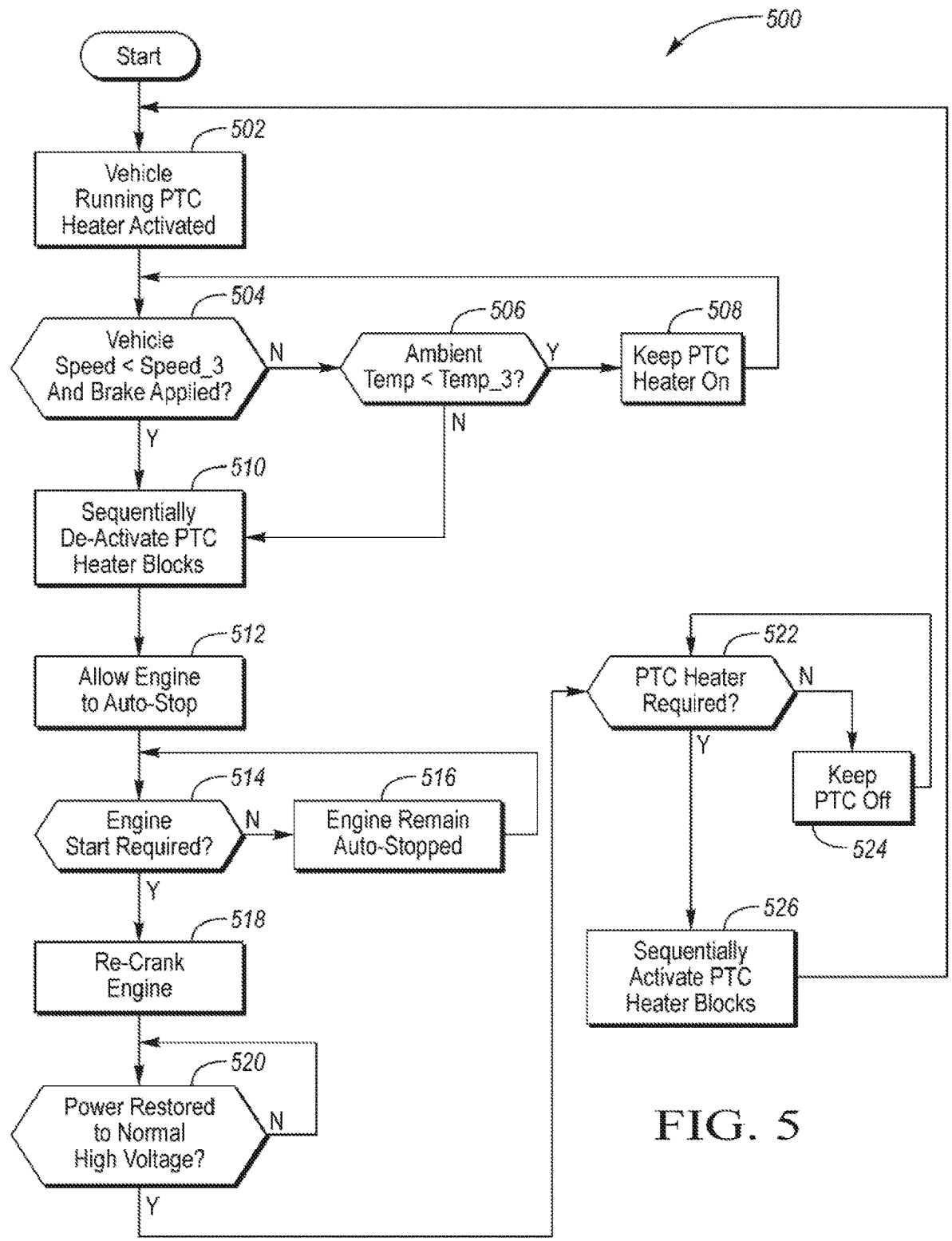
FIG. 5 is a flowchart of a control method of a thermal management system according to an alternative embodiment.

Referring to FIG. 5, a method 500 is depicted according, to an aspect of the present disclosure. According to method 500 the PTC heater banks may be deactivated before and after an engine start-stop event. At step 502 the vehicle is running and the PTC heater banks are energized. At step 504 a vehicle controller may assess whether a low speed braking condition is present. If there is no low speed braking at step 504 the controller then assesses the external ambient temperature at step 506. If the external ambient temperature is sufficiently cold at step 508 (i.e., ambient temperature less than predetermined temperature threshold Temp_3), the controller causes the PTC heating banks to remain on at step 508. The controller then continues to monitor vehicle operation for low speed braking and for an external ambient temperature warm enough to obviate the need for auxiliary PTC heating. If the external ambient temperature is warmer than Temp_3 at step 506, the controller issues a command to begin sequentially deactivating the PTC heater banks at step 510.

If at step 504 the vehicle is going sufficiently slow while the brakes are applied (i.e., vehicle speed less than predetermined speed threshold Speed_3) it may be indicative of an imminent auto stop of the engine. At step 510 the controller issue a command to begin sequentially deactivating the PTC heater banks at step 510. Once the PTC heaters are de-energized, the controller issues a command at step 512 to allow the engine to auto-stop according to other powertrain operating parameters without regard to power demands of PTC heaters.

At step 514 the controller monitors powertrain operation for whether the engine needs to be restarted, tear example in response to a high torque demand from the driver. If no engine restart is required at step 514 the engine remains deactivated at step 516.

At step 518 the controller issues a command to restart the engine. As discussed above, the cranking of the engine may cause a temporary voltage drop. For example the electrical bus may normally be at 12 Volts, but during re-crank the engine starter in-rush current may cause the voltage to reduce to about 6 Volts. The duration of the temporary drop may vary between different engine and starter configurations. At step 520 the controller monitors the electrical bus for the voltage to stabilize to nominal values.

If the voltage level is returned to normal at step 520 the controller may monitor for other conditions that require activation of PTC heaters. For example if the engine was de-activated for an extended period in cold ambient conditions and underwent a cooldown, there may not be sufficient waste heat generated to warm the passenger cabin to a comfortable level. If at step 522 auxiliary PTC heating is not required, the controller keeps the PTC heater banks deactivated at step 524 and monitors for conditions which may require auxiliary heating. If at step 522 auxiliary PTC heating is required, the controller issues a command to sequentially energize each of the plurality of PTC banks in order to limit the magnitude of any corresponding spikes in power demand.

The present disclosure provides representative control strategies and/or logic that may be implemented using one or more processing strategies such as event-driven, interrupt-driven, multi-tasking, multi-threading, and the like. As such, various steps or functions illustrated herein may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but it is provided for ease of illustration and description.

The control logic may be implemented primarily in software executed by a microprocessor-based vehicle, engine, and/or powertrain controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While examples are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle climate control system comprising:
   a heat exchanger to heat ambient air using engine waste heat;
   an auxiliary heater independent of engine waste heat; and
   a controller programmed to issue an on/off command to the auxiliary heater based on an engine on/off transition,
   wherein the on/off command to the auxiliary heater is offset by a time being a power-surge dissipation time period of the auxiliary heater.

2. The vehicle climate control system of claim 1 wherein the controller is further programmed to, while an electric machine is a sole vehicle propulsion source, issue the on/off command to de-energize the auxiliary heater in advance of an upcoming engine start.

3. The vehicle climate control system of claim 2 wherein the controller is further programmed to, issue the on/off command to energize the auxiliary heater after the upcoming engine start.

4. The vehicle climate control system of claim 1 wherein the auxiliary heater comprises a plurality of heating elements, wherein the controller is further programmed to, in response to an engine operating temperature that is less than an engine temperature threshold, issue the on/off command to sequentially energize each of the plurality of heating elements.

5. The vehicle climate control system of claim 1 wherein the auxiliary heater comprises a plurality of heating elements, wherein the controller is further programmed to issue the command on/off command to sequentially de-energize the plurality of heating elements in response to the vehicle operating at a speed greater than a first speed threshold for longer than a predetermined duration of time.

6. The vehicle climate control system of claim 1 wherein the auxiliary heater comprises a plurality of heating elements, wherein the controller is further programmed to issue the on/off command to sequentially de-energize the plurality of heating elements in response to a signal indicative of an engine temperature that is greater than a predetermined temperature threshold.

7. The vehicle climate control system of claim 1 wherein the auxiliary heater comprises at least one positive temperature coefficient (PTC) heating element to heat air passed through the heat exchanger and configured to provide heated air to a passenger cabin through fluid flow communication.

8. The vehicle climate control system of claim 1 wherein the on/off command comprises de-energizing the auxiliary heater in response to the vehicle operating at a speed greater than a first speed threshold for longer than a predetermined duration of time.

9. The vehicle climate control system of claim 1 wherein the controller is further programmed to, in response to an engine operating temperature that is less than an engine temperature threshold, issue the on/off command to energize the auxiliary heater.

10. A vehicle climate control system comprising:
a heat exchanger to heat ambient air using engine waste heat;
an auxiliary heater independent of engine waste heat; and
a controller programmed to:
while an electric machine is a sole vehicle propulsion source, issue an on/off command to the auxiliary heater to de-energize the auxiliary heater in advance of an upcoming engine start.

11. The vehicle climate control system of claim 10 wherein the controller is further programmed to, issue the on/off command to the auxiliary heater prior to the engine on/off transition, wherein the on/off transition comprises starting the engine,
wherein the on/off command comprises de-energizing the auxiliary heater.

12. The vehicle climate control system of claim 11 wherein the on/off command de-energizing the auxiliary heater is in response to a signal indicative of an engine temperature that is greater than an engine threshold.

13. The vehicle climate control system of claim 11 wherein the on/off command de-energizing the auxiliary heater is in response to the engine operating at a speed greater than a first threshold for longer than a predetermined duration of time.

14. The vehicle climate control system of claim 10 wherein the on-off commend is offset from the upcoming engine start by a time being a power-surge dissipation time period.

15. The vehicle climate control system of claim 10 wherein the controller is further programmed to, issue the on/off command to de-energize the auxiliary heater in response to a signal indicative of an engine temperature that is greater than an engine threshold.

16. The vehicle climate control system of claim 10 wherein the controller is further programmed to, in response to an engine operating temperature that is less than an engine temperature threshold, issue the on/off command to energize the auxiliary heater.

17. The vehicle climate control system of claim 10 wherein the controller is further programmed to, in response to application of a brake while the vehicle is operating at a speed greater than a speed threshold, issue the on/off command to de-energize the auxiliary heater.

18. The vehicle climate control system of claim 10 wherein the controller is further programmed to, issue the on/off command to de-energize the auxiliary heater in response to the engine operating at a speed greater than a first threshold for longer than a predetermined duration of time.

19. The vehicle climate control system of claim 10 wherein the controller is further programmed to, issue the on/off command to de-energize the auxiliary heater in response to the vehicle operating at a speed greater than a first speed threshold for longer than a predetermined duration of time.

20. The vehicle climate control system of claim 10 wherein the controller is further programmed to, issue the on/off command to the auxiliary heater after the engine on/off transition, wherein the on/off transition comprises stopping the engine, and
wherein the on/off command comprises energizing the auxiliary heater.

* * * * *